June 19, 1934.                A. W. TALBOT                1,963,596
                         REVERSE MOTION PREVENTER
                         Filed Dec. 20, 1932        2 Sheets-Sheet 1

INVENTOR.
Archibald W. Talbot
BY
Robert L Rockwell
ATTORNEY.

June 19, 1934.　　A. W. TALBOT　　1,963,596

REVERSE MOTION PREVENTER

Filed Dec. 20, 1932　　2 Sheets-Sheet 2

INVENTOR.
Archibald W. Talbot
BY
Robert L Rockwell
ATTORNEY

Patented June 19, 1934

1,963,596

UNITED STATES PATENT OFFICE 1,963,596

REVERSE MOTION PREVENTER

Archibald W. Talbot, Seattle, Wash.

Application December 20, 1932, Serial No. 648,096

10 Claims. (Cl. 192—4)

My invention relates to improvements in controlled reverse motion preventers in general, and particularly to controlled means for preventing undesired reverse motion of automotive vehicles brought to rest for any reason on ascending grades.

In its preferred embodiment no auxiliary control is required. The device is engaged automatically when the gear-set lever is shifted to the low-speed-forward position and, so long as this position is maintained, reverse or retrograde motion is prevented without application of the brakes, thus permitting the foot to be used for the operation of the foot throttle in accelerating the car in the forward direction. For all other positions of the gear-set, the vehicle may be maneuvered in the usual manner without interference by the reverse motion preventer.

An object of my invention is to provide improved means for preventing undesired reverse motion whereby said means is operative when the mechanism used in connection therewith is set for initial acceleration in the forward direction, and is automatically disengaged, inoperative, and not subject to wear for all other settings of said mechanism.

Another object is to provide a simple, compact, reliable device of the kind described that is positive in its operation, cheap to manufacture, and readily accessible for inspection, adjustments and repairs.

Other objects and advantages will be apparent from the following detailed description of a preferred form of the invention, which consists of certain parts and combination of parts hereinafter described, illustrated in the accompanying drawings and embraced in the appended claims.

In the drawings.

Like reference numerals are used to indicate like parts throughout the several views of the drawings.

Figure 1:
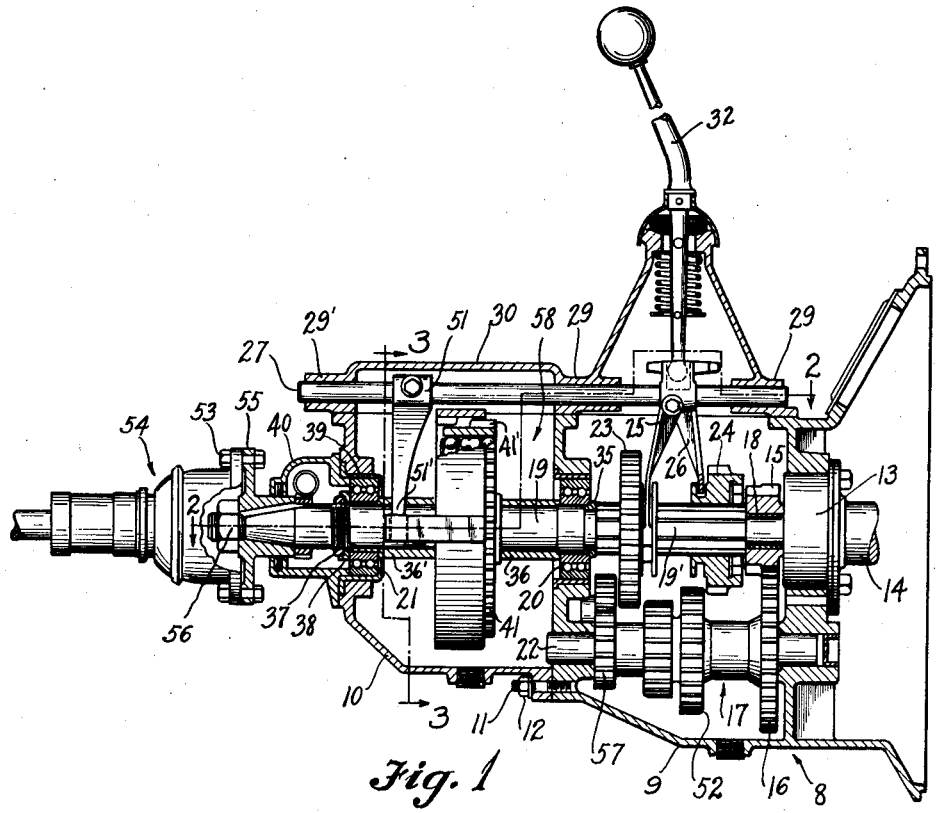
Figure 1 is a sectional elevation illustrating the invention in operative combination with the transmission of an automobile.
Figure 2:
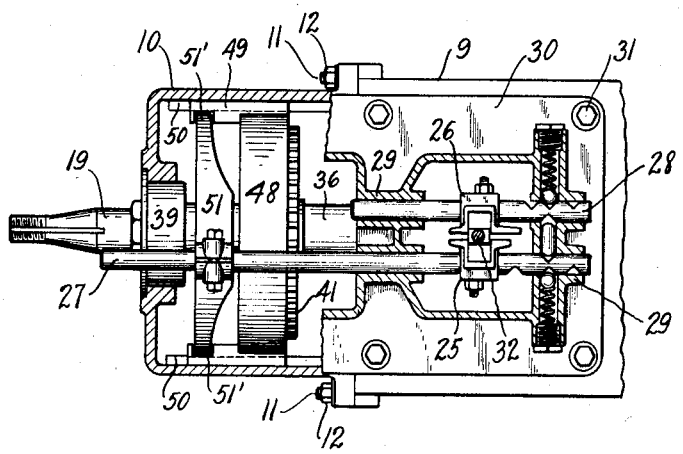
Fig. 2 is a plan view, partly in section, on broken line 2—2 of Fig. 1 with the usual universal joint elements and speedometer gears and gear housing removed.

The general arrangement of the coacting parts is seen best in Figures 1 and 2 of the drawings where numeral 8 indicates the usual selective type of transmission or change-speed gearing having a housing 9 adapted to be secured to the rear end of the engine frame, not shown. In adapting my invention for automotive use I prefer to enclose the device in an oil tight auxiliary housing 10 which may be removably secured to change-speed housing 9 by means of suitable stud bolts 11 and nuts 12. Bearing 13 supports one end of the usual clutch shaft 14 which terminates in gear 15 in driving engagement with gear 16 of counter shaft gear assembly 17, and carries sleeve bearing 18 adapted to receive the journal end of drive shaft 19. This shaft may be nal end of drive shaft 19. This shaft may be rotatively supported also by bearing 20 in the end wall of housing 9 and by bearing 21 in the end wall of housing 10. The usual counter shaft gear assembly is rotatively mounted on shaft 22 fixedly mounted in the front and rear walls of the transmission housing.

Shaft 19 is provided with splines 19' on which gears 23 and 24 are slidably mounted and adapted to be operatively positioned by forked members 25 and 26 fixedly secured to rods 27 and 28 respectively, which in turn are slidably mounted in bearings 29 and 29' in cover 30 removably secured to housings 9 and 10 by means of cap screws 31. Cover 30 also provides the usual pivotal mounting for gear shift lever 32, the lower end of which is adapted to engage either of the recesses provided at the upper extremities of forked members 25 and 26.

Figure 3:
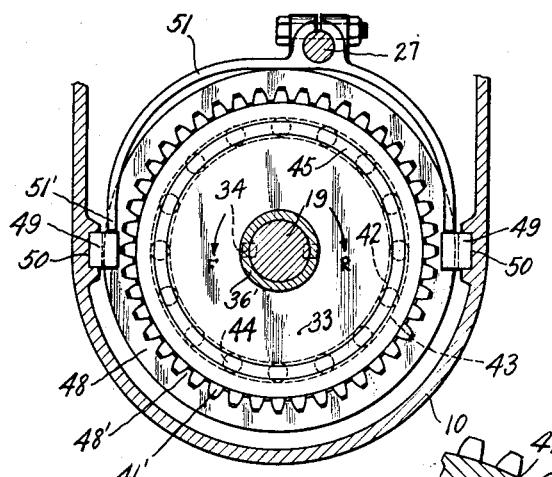
Fig. 3 is a section on broken line 3—3 of Fig. 1 showing an end elevation of the device drawn to a larger scale.
Figure 4:
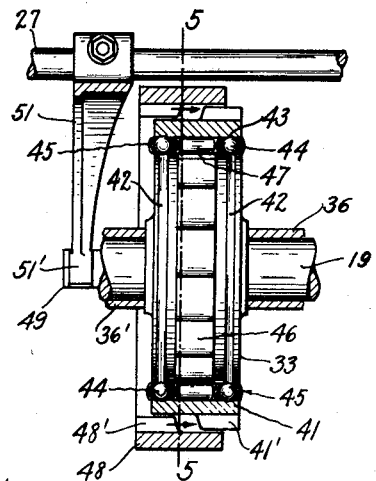
Fig. 4 is a side elevation of the same with the outer elements in longitudinal section.

The reverse motion preventer parts are shown best in Figs. 3 and 4. The inner cylindrical or cam element 33 is adapted to be mounted within housing 10 on shaft 19 to which it may be fixedly secured by keys 34. Referring to Fig. 1, shouldered snap ring 35, tubular spacers 36 and 36' and nut 37 may be employed cooperatively to securely position cam member 33 and bearings 20 and 21 axially of the shaft, lock washer 38 being effective to prevent the loosening of nut 37. It will be noted that flanged sleeve 39 and the shoulder ring of speedometer gear housing 40 definitely position bearing 21 longitudinally in housing 10 to which housing 40 may be removably secured by suitable cap screws, not shown. This arrangement permits the outer race of bearing 20 and the journal end of shaft 19 to move longitudinally relative to the several parts as they expand and contract due to changes in temperature.

Figure 6:
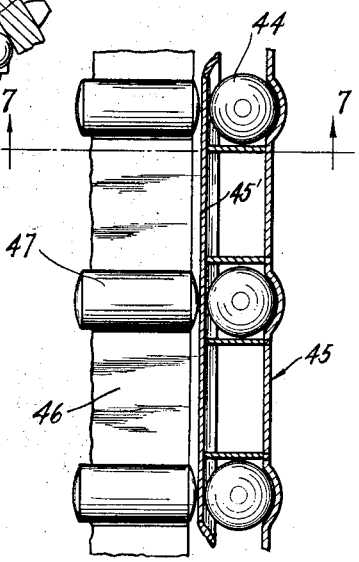
Fig. 6 is an enlarged fragmentary section through one of the ball cages on broken line 6—6 of Fig. 5.

Cam element 33 and annulus 41 are provided with grooves 42 and 43 respectively, which form raceways for two groups of balls 44 maintained in spaced apart relation by means of suitable cages 45 as shown clearly in Figs. 3, 4 and 6. It will be apparent from the foregoing description that annulus 41 is rotatively supported coaxially of cam element 33, and that these grooves and balls co-operate also to maintain said annulus in definite position longitudinally of said cam element. Ball cages 45 preferably are so constructed that they are supported by the balls they position so as not to contact either the cam element or annulus. A plurality of short strong teeth 41' are formed on the periphery of annulus 41 for the purpose hereinafter described.

Figure 8:
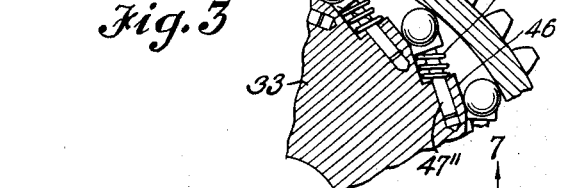
Fig. 8 is an enlarged fragmentary mid-section through the locking rollers, similar to Fig. 5, illustrating the use of resilient elements to position the locking rollers, if desired.
Figure 5:
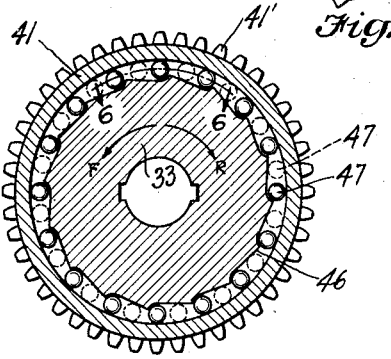
Fig. 5 is a section on broken line 5—5 of Fig. 4 with the outer member removed.
Figure 7:
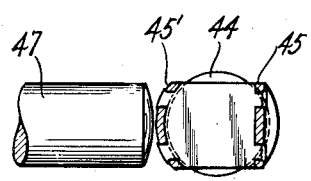
Fig. 7 is an enlarged fragmentary detail of one of the rollers and a section through the ball cage taken on broken line 7—7 of Fig. 6.

The central peripheral portion of member 33 may be provided with a plurality of relatively inclined cam surfaces 46 which, in combination with the interior surface of annulus 41, form tapered pockets adapted to receive rollers 47, preferably having spherically shaped ends, as shown clearly in Figs. 4 and 5. Said rollers are positioned longitudinally within their respective pockets thus formed by means of the inner ball-cage annuli 45', which may be curved in section to conform to the periphery of the balls as illustrated in Fig. 7, thus providing strong continuous side guides. It is the purpose of these rollers to wedge toward the smaller end of their respective tapered pockets upon reversal of rotation cam element 33 when annulus 41 is secured against rotation as hereinafter explained. If desired, resilient elements 47' and shoe elements 47'', illustrated in Fig. 8, may be used to urge the rollers toward the smaller end of said tapered pockets, thus reducing the amount of reverse motion otherwise required to interlock the cylindrical element with the toothed annulus.

An outer member 48 may be provided with integral spline elements 49 which fit in grooves 50 provided in housing 10 to slidably position said outer member coaxially of annulus 41. Outer annulus 48 may be provided also with a plurality of inwardly projecting teeth 48', adapted to engage or mesh with teeth 41' of the annulus when the outer member is moved to the right from the position depicted in Figs. 1 and 4. The adjacent edges of teeth 41' and 48' are well chamfered to facilitate this meshing operation. It will be observed that teeth 41' occupy only a part of the width of the periphery of annulus 41, and that teeth 48' occupy only a part of the width of the interior aperture through member 48. The arrangement is such that, before these two sets of teeth can engage, teeth 41' must pass adjacent the untoothed interior width of member 48 and teeth 48' must pass adjacent the untoothed peripheral width of annulus 41. As the rotating elements run in oil contained in housing 10, there is a well defined drag exerted by the oil between the annulus, rotatively mounted on the cam element, and the stationary member slidably mounted in housing 10. This greatly facilitates the aforesaid meshing operation.

To control the position of the outer annulus, I prefer to employ a forked member 51 fixedly secured to rod 27, the arrangement being such that ends 51' of said fork member engage suitable vertically disposed notches in splines 49. As forked member 25 is also fixedly secured to rod 27 it is apparent that the outer member of the reverse motion preventer is interlocked with gear 23, and will be moved whenever gear 23 is moved by gear shift lever 32. Fork 51 is so positioned on rod 27 that, when gear 23 is shifted into engagement with gear 52 of the counter shaft gear assembly for initial speed forward, the teeth of these gears must first be engaged before teeth 41' and 46' of the reverse motion preventer can mesh as will be seen clearly in Fig. 1. The face of gear 50 is of sufficient width to provide for this important operation. It is apparent that the drawings depict the entire mechanism in the well known "neutral" position.

While it is possible to ascend many grades in "intermediate" and "high", it often happens that the car must be stopped for various reasons before the top of the grade is reached, as at cross streets to allow traffic to pass before entering the intersection. Accelerating the car again in the forward direction under such conditions is unusually difficult, especially where automatic clutches controlled by the foot throttle are employed.

In the case of the usual clutch mechanism, this operation involves moving the gear shift lever to "low", with the clutch released with the left foot, holding the car against retrograde motion by means of the service brakes operated by the right foot, removing one hand from the steering wheel to manipulate the hand throttle to admit the required amount of fuel as the clutch is engaged and the foot brakes released; all of which must be nicely executed in proper sequence to prevent stalling the engine. As the driver is accustomed to use the right foot to manipulate the foot throttle, he is greatly handicapped in the aforesaid operation by having to use the hand throttle instead.

When the car is equipped with the device of my invention and the driver moves the gear shift lever to the left rear or "low" position, it will be apparent from the foregoing description that outer member 48 is automatically moved into positive engagement with annulus 41 by the meshing of teeth 48' with teeth 41' as previously explained. The driver may then remove his foot from the brake pedal whereupon cam element 33 is rotated slightly as the rearward motion of the car wheels turn it in direction R thereby wedging rollers 47 into their several locked positions, as indicated by the dotted circles in Fig. 5. This operation securely interlocks the cam element to the annulus which in turn is secured against rotation by engagement with the outer member slidably mounted in housing 10. In this manner reverse motion of the car is prevented, and the driver may use the foot removed from the brake pedal to skillfully operate the foot throttle in the usual way while gradually engaging the clutch with the other foot. The hands are thus available for steering and signalling, the whole contributing greatly to the ease and safety of operation, especially on steep grades and crowded thoroughfares.

As the car moves forward, cam member 33 is rotated in direction F relative to the stationary annulus 41, which operation returns wedging rollers 47 to their released positions indicated by the solid lines in Fig. 5. In case the car should again be stopped while in "low" gear, the reverse motion preventer is instantly and automatically effective in preventing retrograde motion without having to use the brake except to decelerate the car in the forward direction.

When the shift is made from "low" to "intermediate" and "high" by means of the well known operations, rollers 47 obviously are in their released positions and outer member 48 is readily moved rearwardly to the "neutral" position illustrated, after which it will be apparent that the lower end of lever 32 is transferred into engagement with fork 26 to shift gear 24 in the usual manner. In shifting to "reverse", gear 23 is moved rearwardly into engagement with reverse gear 57, and outer member 48 is simultaneously moved rearwardly in grooves 50 away from annulus 41.

The invention is thus automatically made effective to prevent retrograde motion whenever the gear shift lever is moved to the low speed forward position but is disengaged for "neutral" and all other positions, hence does not prevent the driver from manipulating the car when parking or maneuvering for any other purpose.

The device is readily accessible for adjustment and repairs. By removing cap screws 31, cover 30 may be removed together with forks 25, 26 and 51, thus providing access to both the transmission gearing and the several parts of the reverse motion preventer within housings 9 and 10 respectively. After draining the oil from housing 10, removing bolts 53 to free the universal joint 54 from flange element 55, and removing nuts 12, said housing may be removed together with shaft 19 without disturbing the cam element assembly. Outer member 48 may then be removed from the housing. The removal of nut 56, flange element 55 and housing 40 permits the removal of nut 37, bearing 21, tubular spacer 36' and the cam element assembly.

This simplicity of construction is of great advantage in manufacturing and assembling the several parts. Furthermore the construction is adapted to facilitate the use of the reverse motion preventer in combination with the well-known free-wheeling unit, the space 58 within housing 10 being adapted to accommodate certain operative elements thereof without interference with the reverse motion preventer mechanism of my invention.

While I have illustrated and described my device in a preferred form as applied to automotive vehicles, it will be apparent to those skilled in the art that it may be adapted to prevent undesirable reverse motion in connection with many other mechanisms in industry, and that various changes may be made in the details of construction without departing from the purpose and intent of the invention as expressed in the appended claims.

What I claim as new and desire to protect by Letters Patent is:

1. In a reverse motion preventer, the combination with a housing, of a rotatively mounted shaft providing an enlarged cylindrical element within said housing, a toothed annulus rotatively mounted on said element, wedging rollers adapted to interlock said annulus with said element when the same is rotated in reverse direction, and a clutch member slidably mounted in said housing and providing a plurality of teeth adapted to engage with the teeth of said annulus, whereby balanced torque forces are transmitted to said housing from said shaft upon reverse motion thereof.

2. In a reverse motion preventer, the combination of a housing, a cylindrical drum element rotatively mounted within said housing, a toothed annulus rotatively mounted on said element, a plurality of wedging rollers for interlocking said element with said annulus upon reverse motion thereof, and a toothed member slidably mounted within said housing and adapted to be positively engaged with or to be disengaged from said toothed annulus, whereby torque-couple forces are transmitted to said housing.

3. In a reverse motion preventer, the combination of a housing, a cylindrical drum element rotatively mounted within said housing, a toothed annulus rotatively mounted on said element, a plurality of wedging rollers for interlocking said element with said annulus upon reverse motion thereof, a toothed member slidably mounted within and adapted to transmit torque-couple forces to said housing, and means adapted to slidably position said member for positive engagement with or disengagement from said annulus.

4. In a reverse motion preventer, the combination of a housing, a cylindrical element having a plurality of spaced apart peripheral grooves rotatively mounted in said housing, a toothed annulus having a plurality of spaced apart interior grooves in alignment with said peripheral grooves, a plurality of balls in spaced apart relation adapted to traverse said aligned peripheral and interior grooves to rotatively position said annulus on said element, a plurality of wedging rollers for interlocking said element with said annulus upon reverse motion thereof, and means cooperative with said housing to positively engage or to disengage the teeth of said annulus.

5. In a reverse motion preventer, the combination of a housing, a cylindrical element having a plurality of spaced apart peripheral grooves rotatively mounted in said housing, a toothed annulus having a plurality of spaced apart interior grooves in alignment with said peripheral grooves, a plurality of balls adapted to traverse said aligned peripheral and interior grooves to rotatively position said annulus on said element, a plurality of wedging rollers for interlocking said element with said annulus upon reverse motion thereof, cage means adapted to maintain the balls in each of said aligned grooves in spaced apart relation and to form side guides for said rollers, and means cooperative with said housing to positively engage or to disengage the teeth of said annulus.

6. In a device of the class described the combination of a housing, a cylindrical element embodying a plurality of central peripheral cam surfaces rotatively mounted within said housing, a plurality of rolling means on said cam surfaces, a toothed annulus exterior of said cylindrical member, a plurality of bearing means rotatively positioning said annulus on said cylindrical element and forming side guides for said rolling means, a member slidably mounted in said housing having teeth adapted to engage with the teeth of said annulus, and mechanism means adapted to slidably position said member to engage the teeth of the same with the teeth of said annulus when reverse motion of said element is to be prevented and to disengage said teeth when reverse motion of said element is desired.

7. In a lubricant immersed reverse motion preventer, the combination of a cylindrical element rotative within said housing, an annulus having a plurality of teeth around a partial width of its periphery rotatively mounted on said element, wedging rollers for interlocking said element with said annulus upon reverse motion thereof, a member slidably mounted in said housing having interior teeth adapted to engage the teeth of said annulus after passing adjacent the untoothed peripheral width of said annulus, whereby said lubricant provides a drag effective to facilitate the engagement of said teeth.

8. In a lubricant immersed reverse motion preventer, the combination of a cylindrical element rotatively mounted within said housing, an annulus having exterior teeth around a partial width of its periphery rotatively mounted on said element, wedging rollers for interlocking said element with said annulus upon reverse motion thereof, a member slidably mounted in said housing having interior teeth around a partial width of an aperture therethrough said teeth being adapted to engage with the teeth of said annulus after the untoothed widths of said member and said element pass adjacent the toothed widths of said element and said member respectively, whereby said lubricant provides a drag effective to facilitate the engagement of said teeth.

9. In combination, a change speed gearing embodying a driving shaft and a slidable gear adapted to be engaged with and disengaged from a non-slidable gear, a housing, a cylindrical element rotatively mounted in said housing in driving connection with said shaft, a toothed annulus rotatively mounted on said element, a plurality of wedging rollers for interlocking said element with said annulus upon reverse motion thereof, a member slidably mounted in said housing having teeth adapted to engage with the teeth of said annulus, and gear shift means interlocking said slidable gear and said slidably mounted member, whereby first the teeth of said slidable gear are engaged with the teeth of said non-slidable gear and then the teeth of said member are engaged with the teeth of said annulus.

10. In combination, a change speed gearing embodying initial speed forward and reverse gears adapted to be engaged with and disengaged from a gear slidable upon a drive shaft, a housing, a cylindrical element rotatively mounted within said housing in operative connection with said drive shaft, a toothed annulus rotatively mounted on said element, a plurality of wedging rollers for interlocking said element with said annulus upon reverse motion thereof, a member slidably mounted in said housing having teeth adapted to engage with the teeth of said annulus, and gear shift means interlocking said slidable gear and said slidably mounted member, whereby the teeth of said member are engaged with the teeth of said annulus only when said slidable gear is shifted into operative engagement with said initial speed forward gear.

ARCHIBALD W. TALBOT.